(12) United States Patent
Guan et al.

(10) Patent No.: US 11,768,631 B2
(45) Date of Patent: Sep. 26, 2023

(54) RAPID RELIABLE FILE SYSTEM ACCESS

(71) Applicant: Micron Technology, Inc., Boise, ID (US)

(72) Inventors: Huapeng G. Guan, Redwood City, CA (US); Ximin Shan, Milpitas, CA (US); Yipei Yu, San Francisco, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 17/462,289

(22) Filed: Aug. 31, 2021

(65) Prior Publication Data

US 2023/0062949 A1 Mar. 2, 2023

(51) Int. Cl.
  *G06F 3/06* (2006.01)
  *G06F 11/14* (2006.01)

(52) U.S. Cl.
  CPC .......... *G06F 3/0659* (2013.01); *G06F 3/0604* (2013.01); *G06F 3/0676* (2013.01); *G06F 3/0679* (2013.01); *G06F 11/1448* (2013.01)

(58) Field of Classification Search
  CPC .... G06F 3/0659; G06F 3/0604; G06F 3/0676; G06F 3/0679; G06F 3/061; G06F 3/0619; G06F 3/064; G06F 3/0673; G06F 3/0611; G06F 3/0656; G06F 3/0688; G06F 3/0653; G06F 3/0644; G06F 3/0631; G06F 3/065; G06F 3/0658; G06F 3/0608; G06F 3/0689; G06F 3/0613; G06F 3/0683; G06F 3/0647; G06F 3/0655; G06F 11/1448; G06F 12/0246; G06F 2212/7201; G06F 11/1446; G06F 2201/81
See application file for complete search history.

(56) References Cited

U.S. PATENT DOCUMENTS

| | | | |
|---|---|---|---|
| 8,595,409 B2* | 11/2013 | Kim | G06F 12/0246 711/E12.008 |
| 8,756,361 B1* | 6/2014 | Carlson | G11B 27/36 711/E12.016 |
| 2013/0080732 A1* | 3/2013 | Nellans | G06F 12/0246 711/206 |
| 2014/0223079 A1* | 8/2014 | Zhang | G06F 12/0246 711/103 |

(Continued)

*Primary Examiner* — Khoa D Doan
*Assistant Examiner* — Tong B. Vo
(74) *Attorney, Agent, or Firm* — Lowenstein Sandler LLP (57) ABSTRACT

A system for file system data access can include memory devices including a non-volatile memory device, as well as a processing device, operatively coupled with the memory devices to perform operations including receiving a file system (FS) write command and determining whether a write count of a physical super management unit (PSMU) of the non-volatile memory device satisfies a threshold criterion. The operations can include, recording a change of a super management unit (SMU) mapping for FS data of an FS mapping table, where the FS mapping table is a portion of a logical-to-physical (L2P) mapping table and performing a move of SMU data corresponding to the change of the SMU mapping. They can also include creating a backup copy of the FS mapping table on the non-volatile memory device, and restoring the FS mapping table from the backup copy of the FS mapping table.

20 Claims, 5 Drawing Sheets

(56) References Cited

U.S. PATENT DOCUMENTS

| | | | |
|---|---|---|---|
| 2015/0134621 A1* | 5/2015 | Ki | G06F 16/16 |
| | | | 707/689 |
| 2015/0149706 A1* | 5/2015 | Salessi | G06F 12/1009 |
| | | | 711/103 |
| 2016/0117252 A1* | 4/2016 | Thangaraj | G06F 12/0804 |
| | | | 711/118 |
| 2022/0075717 A1* | 3/2022 | Gunnam | G06F 12/0246 |

* cited by examiner

RAPID RELIABLE FILE SYSTEM ACCESS

TECHNICAL FIELD

Embodiments of the disclosure relate generally to memory sub-systems, and more specifically, relate to improving the reliability and speed of access to file system data.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to reliable and rapid access to file system data. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, three-dimensional cross-point ("3D cross-point") memory, which can include a cross-point array of non-volatile memory cells, offers storage in the form of compact, high density configurations. Other examples of non-volatile memory devices are described below in conjunction with FIG. 1. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

Certain non-volatile memory devices use a Flash Translation Layer (FTL) to translate logical addresses of memory access requests, often referred to as logical block addresses (LBAs), to corresponding physical memory addresses, which can be stored in one or more FTL mapping tables. LBAs can be the logical addresses used by a host system for managing data. In some instances, the FTL mapping table can be referred to as a logical-to-physical (L2P) mapping table storing L2P mapping information. Accordingly, the L2P mapping table can be used to locate system data on the physical medium of a memory device. A client (e.g., an application programming interface (API)) of the file system can read a file ID to identify where the particular file is located on the physical medium of a memory device. Portions of the L2P mapping table can be retrieved from and written to the memory device on demand, which can cause performance degradation. These non-volatile memory devices can have an internal file system (FS) that can be used by the firmware (FW) or other components to organize system data stored in the media of the memory devices. In some cases, the mapping from file ID to media address for system data is located in the same L2P mapping table as the host data in order to take advantage of a single mechanism for handling wear leveling, read disturbance, and write disturbance on the medium of a memory device (i.e., not needing to have separate mechanisms for FS data and for host data, respectively). In these cases the LBA range of the L2P mapping table is extended to include the FS data mapping as well.

For some of these non-volatile memory devices, the L2P mapping table is reconstructed (also referred to herein as being "rebuilt") every time the device powers up. However, because the FS data mapping is included in the same L2P mapping table as the host data, if the reconstruction of the L2P mapping table fails, the file system cannot be accessed due to the lack of FS data mapping. Without the ability to access the file system, critical system data and debugging information (e.g., assert dump) that is useful to debug drive failures becomes inaccessible. Moreover, in some instances security FW needs to access the FS within 3 seconds after power up to meet host system timing requirements. In these instances, oftentimes these requirements cannot be met because of the latency of the L2P mapping table reconstruction.

In some memory devices, conventional approaches have resorted to having file system data stored in a region of the memory medium that is separate from that of the host data, and having the FS data L2P mapping table separated from the host data L2P mapping table. While in these cases the file system data can be accessed even if the host data L2P mapping table cannot be reconstructed, this creates additional burdens on the system incorporating such memory devices due to the need to account for separate media degradation effects from the use of the two separate tables and respective separate media regions. Such traditional approaches require the undesirable additional mechanisms for media endurance management that can account for wear leveling, read disturbance, write disturbance, and other factors affecting media degradation for each of the locations where each respective separate table is recorded.

Aspects of the present disclosure address the above and other deficiencies by having a memory sub-system that can save a backup copy of the File system (FS) part of the logical-to-physical mapping table in a dedicated system media area. This entails saving the extended LBA portion of the L2P mapping table that contains the system data mapping in another area of the non-volatile memory device medium that is unaffected by power cycling. Subsequently, even if the L2P mapping table cannot be reconstructed, the backup copy of FS mapping table can be accessed and used to read FS data.

In some embodiments the FS mapping table can be saved in a dedicated non-volatile memory device medium region as a backup copy in addition to its being saved as part of the larger L2P table. The backup copy can be saved when the FS mapping table gets changed due to a super management unit (SMU) remap (i.e., when there is a mapping change of an SMU in the FS mapping table). The mapping change itself can result from a receipt of a command to execute a move of FS SMU data (i.e., perform an SMU move operation). In some embodiments the SMU remap (mapping change) can be triggered when the write count of a current physical super management unit (PSMU) reaches a threshold due to a FS write operation. However, because FS write operations are infrequent, the SMU remaps for the FS data mapping table can occur only once in a while (i.e., relatively less frequently than remapping of host data). Notably, the size of the FS mapping table is smaller than a management unit (MU) of the medium of the non-volatile memory device, and, therefore, saving a backup copy of the FS mapping table uses only one MU in the medium. Additionally, in some embodiments, the dedicated region can be used as a circular buffer by saving subsequent backup copies of the FS mapping table in the next MU of the region and restarting at the first MU of the region when all the MUs of the region have been written to.

In some embodiments, on power up (e.g., after a power cycle), the FS mapping table can be restored before or as part of the metadata rebuild process (i.e., the L2P table reconstruction). To continue to write to the aforementioned circular buffer in the dedicated region of the medium of the non-volatile memory device for the next FS SMU move operation, the FW can do a binary search to find the pointer to the last FS table saved to the medium before the power loss/cycle. In some embodiments, an additional MU write can be used to write the SMU move operation information before executing the SMU move operation so that the integrity of the backup copy of the FS table can be maintained during a power cycle. In these embodiments, the change in SMU mapping can be recorded in a separate location (e.g., in a different/additional MU from where a backup FS mapping table is saved) on the medium of the non-volatile memory device prior to moving the SMU data. In situations where the rebuild fails, the last backup FS mapping table saved in the medium before the power loss/cycle can be used to access the physical super management units (PSMUs) of the non-volatile memory device containing FS data. In this manner, the FW can access the FS even if the rebuild fails.

Advantages of the present disclosure include but are not limited to having the FS data mapping and the host data mapping being saved in one L2P mapping table that can be managed by one set of media endurance management mechanisms. Furthermore, the present disclosure provides the advantage of having an FS mapping table available for system or FW access before and irrespective of the entire L2P mapping table being successfully reconstructed and allows debugging data to be retrieved from the memory device. In many situations, this permits rapid access to the system data by the FW and fulfills host system timing requirements. The technical advantages presented by the disclosure are that the of the file system data is in the same domain of the storage medium as the host data, thereby requiring only one mechanism for media wear leveling, endurance management, and error handling to handle both host data and file system data. Accordingly, the embodiments of the present disclosure lessen the burdens of requiring additional mechanisms for handling read disturbance, write disturbance, and wear leveling and well as decreasing the time required to access FS data in memory devices.

Figure 1:
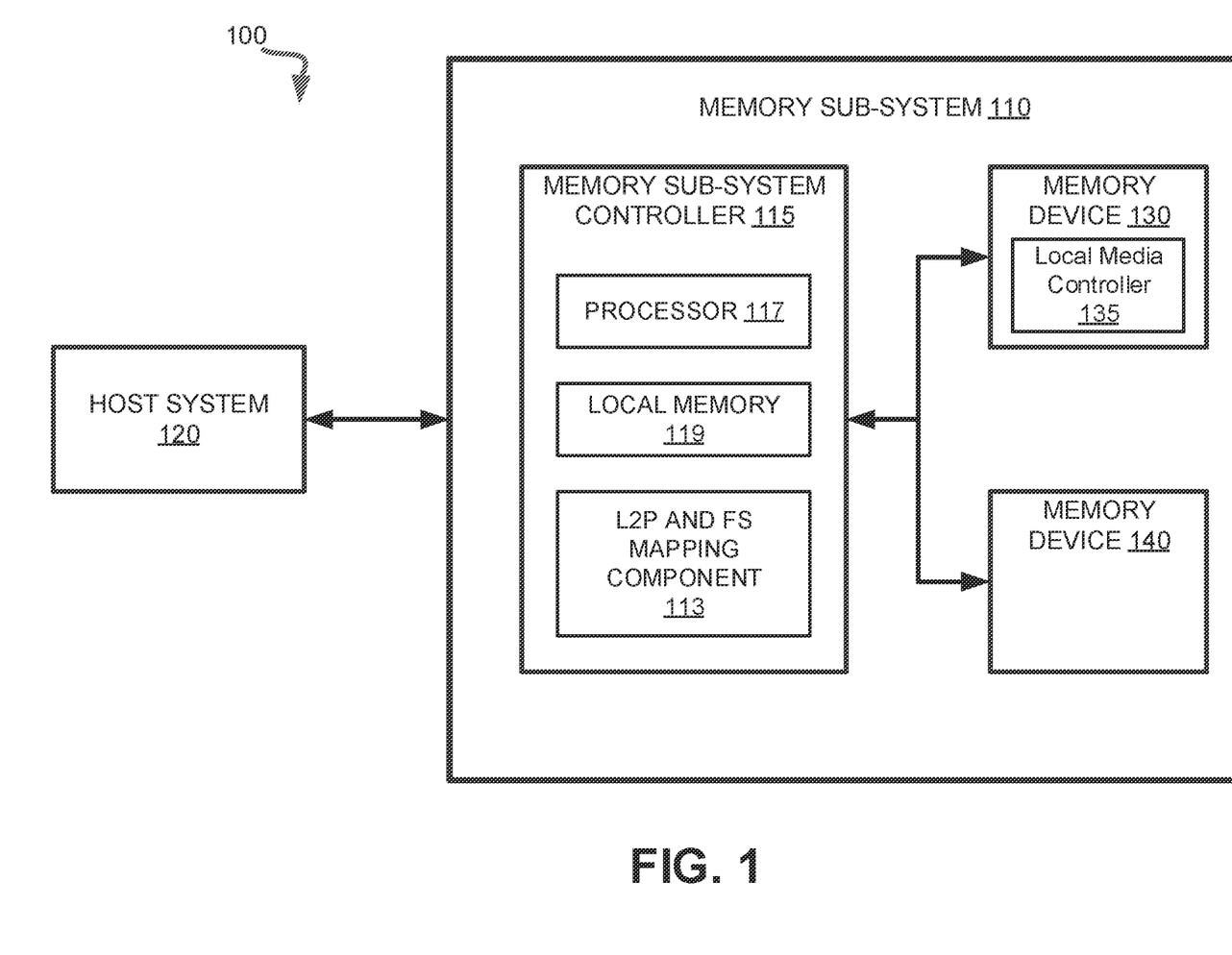
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system 110 includes a logical-to-physical (L2P) and file system (FS) data mapping component 113 that can change mapping tables, save backups of mapping tables, restore mapping tables, and rebuild mapping tables. In some embodiments, the memory sub-system controller 115 includes at least a portion of the L2P and FS mapping component 113. In some embodiments, the L2P and FS mapping component 113 is part of the host system 120, an application, or an operating system. In other embodiments, local media controller 135 includes at least a portion of L2P and FS mapping component 113 and is configured to perform the functionality described herein.

In some embodiments the L2P and FS mapping component 113 can receive a FS write command from the host system 120 or the memory sub-system controller 115. The L2P and FS mapping component 113 coupled to the processor 117 and local memory 119 can determine whether a write count of a physical super management unit (PSMU) of the non-volatile memory device 130 has satisfied a threshold criterion. In various embodiments the threshold criterion can relate to the state of falling below, meeting, or rising above a threshold number of times that the PSMU has been written to or a threshold number of operations which have addressed the PSMU. In response to the threshold criterion being satisfied, the L2P and FS mapping component 113 can record a change of a super management unit (SMU) mapping for FS data of an FS mapping table, where the FS mapping table is a portion of a larger L2P mapping table that also contains host data. Recording the change of the SMU mapping can include recording, in one management unit (MU), a correspondence between a logical super management unit (LSMU), an old physical super management unit (PSMU) of the non-volatile memory device 130 medium, and a new PSMU of the non-volatile memory device 130 medium, for a set of FS data. The L2P and FS mapping component 113 can also perform a move of SMU data corresponding to the change of the SMU mapping. In other words, the L2P and FS mapping component 113 can implement the move operation for the SMU data that corresponds to the new changed mapping of the FS mapping table.

Additionally, the L2P and FS mapping component 113 can create a backup copy of the FS mapping table on the non-volatile memory device 130. Creating the backup copy of the FS mapping table can include recording the backup copy of the FS mapping table in a next management unit (MU) of a dedicated PSMU of the non-volatile memory device 130 medium with dual copy protection, and, in response to reaching a last MU of the dedicated PSMU, recording the backup copy of the FS mapping table in a first management unit (MU) of a dedicated PSMU. The L2P and FS mapping component 113 can also update the L2P mapping table (i.e., the entire L2P mapping table containing both FS data and host data) with the recorded change of the SMU mapping and mark the old PSMU as available. In one embodiment, the L2P and FS mapping component 113 can, in response to a power cycle, restore the FS mapping table to the volatile memory device 140 or the local memory 119 from the backup copy of the FS mapping table. In some embodiments, restoring the FS mapping table includes locating a last backup copy of the FS mapping table saved on the non-volatile memory device 130 before the power cycle, and uploading the last backup copy of the FS mapping table to the volatile memory device 140 or the local memory 119.

The L2P and FS mapping component 113 can also initiate a rebuilding of the L2P mapping table on the volatile memory device 140 or the local memory 119. The rebuilding of the L2P mapping table may or may not be successful and the L2P and FS mapping component 113 can perform different actions in each of those situations. If the rebuilding of the L2P mapping table is unsuccessful, the L2P and FS mapping component 113 can search for the latest change of the SMU mapping as well as the latest backup copy of the FS mapping table on the non-volatile device. In one embodiment, if the L2P and FS mapping component 113 finds the record of the latest change of the SMU mapping and the latest backup copy of the FS mapping table, it is determined that latest backup copy of the FS mapping table is current and corresponds to the last actual mapping change. If L2P and FS mapping component 113 finds the record of the latest change of the SMU mapping and does not find the latest backup copy of the FS mapping table in the medium of the non-volatile memory device 130, it can update the previous backup copy of the FS mapping table with the latest change of the SMU mapping on. In an alternative situation, if the rebuilding of the L2P mapping table is successful, the L2P and FS mapping component 113 can also search for the record of the latest change of the SMU mapping as well as the latest backup copy of the FS mapping table on the non-volatile device. However, in the alternative situation, if the L2P and FS mapping component 113 finds the record of the latest change of the SMU mapping and the latest backup copy of the FS mapping table, it can use the latest backup copy of the FS mapping table in further operations. If the L2P and FS mapping component 113 finds the record of the latest change of the SMU mapping and does not find the latest backup copy of the FS mapping table in the medium of the non-volatile memory device 130, it can write the latest copy of the FS mapping table in L2P mapping table as backup to the non-volatile memory device 130. Further details with regards to the operations of the L2P and FS mapping component 113 are described below with reference to FIGS. 2-4.

In some embodiments of the present disclosure the backup copy of FS mapping table is saved when the FS mapping table get changed due to a SMU remap. In these embodiments, the size of FS mapping table is less than or equal to one MU, so the system does not need to use more than MU to save the backup FS mapping table data each time. One dedicated PSMU can be used to save the backup FS mapping table. In one embodiment the dedicated PSMU can be used as a circular buffer with each data slot being identified by a sequence number. The benefit of using the dedicated PSMU as a circular buffer is that a different physical MU can be written to every time a copy of the FS mapping table is recorded, thereby reducing media endurance issues and maintaining wear leveling. Accordingly, each time FS mapping table is saved, a new slot (i.e., the slot with the next sequence number) is used. In some embodiments, a dual copy protection of the FS table can be used. Dual copy protection entails that an identical copy of the backup copy of the FS mapping table is saved in another (i.e., a second) PSMU as well. Because the SMU remap for FS data can be triggered when the write count of the current PSMU reaches a threshold due to a FS write operation, the SMU remap for FS data should occur relatively infrequently compared to other rewrite operations.

In other embodiments, on power up, the FS backup table can get restored before or during the metadata rebuild process. This can be beneficial because the L2P table being rebuilt may not be accurate due to power down occurring during a remap operation as well as because the rebuild operation may fail. In some embodiments, the FW can perform a binary search to find the pointer to the last FS backup table (which should have the largest sequence number) that was saved before power loss. The backup copy of the FS mapping table can then be read/uploaded from the medium of the non-volatile memory to the volatile memory device or local memory to complete restoration of FS table. In these embodiments, the restoration of the FS mapping table can be followed by the reconstruction of the whole L2P table. Accordingly, before the reconstruction of the L2P table, the FS backup table can be used to ensure that FS access is available, while after reconstruction of the L2P table the entire L2P table can be used. However, if the L2P table reconstruction fails, the last/latest backup copy of the FS mapping table can be used to access the FS data. In some embodiments, an additional MU write can be used to write SMU move information before the SMU move operation is executed in order to maintain the integrity of the backup copy of the FS table during a power cycle. This may be beneficial because the process of backing up the FS mapping table can be delayed due to an inherent FW operation time delay and a power loss may occur in the time between the FS write operation triggering the FS mapping change and the saving operation of the backup copy of the FS mapping table and can result in the latest saved backup FS mapping table not accurately reflecting the latest FS mapping change. Therefore, to address this situation, the information of the latest FS table change can be saved into the medium in a different MU than the backup copy of the FS mapping table or the L2P table. Notably, the record of the latest mapping change, the backup copy of the FS mapping table, and the L2P mapping table can each respectively be saved in a different location on the medium of the non-volatile memory device (i.e., each in a different MU or PSMU, respectively). This way, on power up after a power loss occurring prior to the latest backup copy of the FS mapping table being recorded, the immediately previous backup copy of the FS mapping table (which is outdated) can be accessed and combined with the change recorded by the additional MU write referred to above to result in the current/accurate FS backup table reflective of the latest mapping change. Lastly, in some embodiments, if there is an uncorrectable error code correction error, the dedicated PSMU can be marked as defective and replaced with a spare PSMU to continue writing the FS mapping table. These and other details of the present disclosure are described below with reference to FIGS. 2-4.

Figure 2:
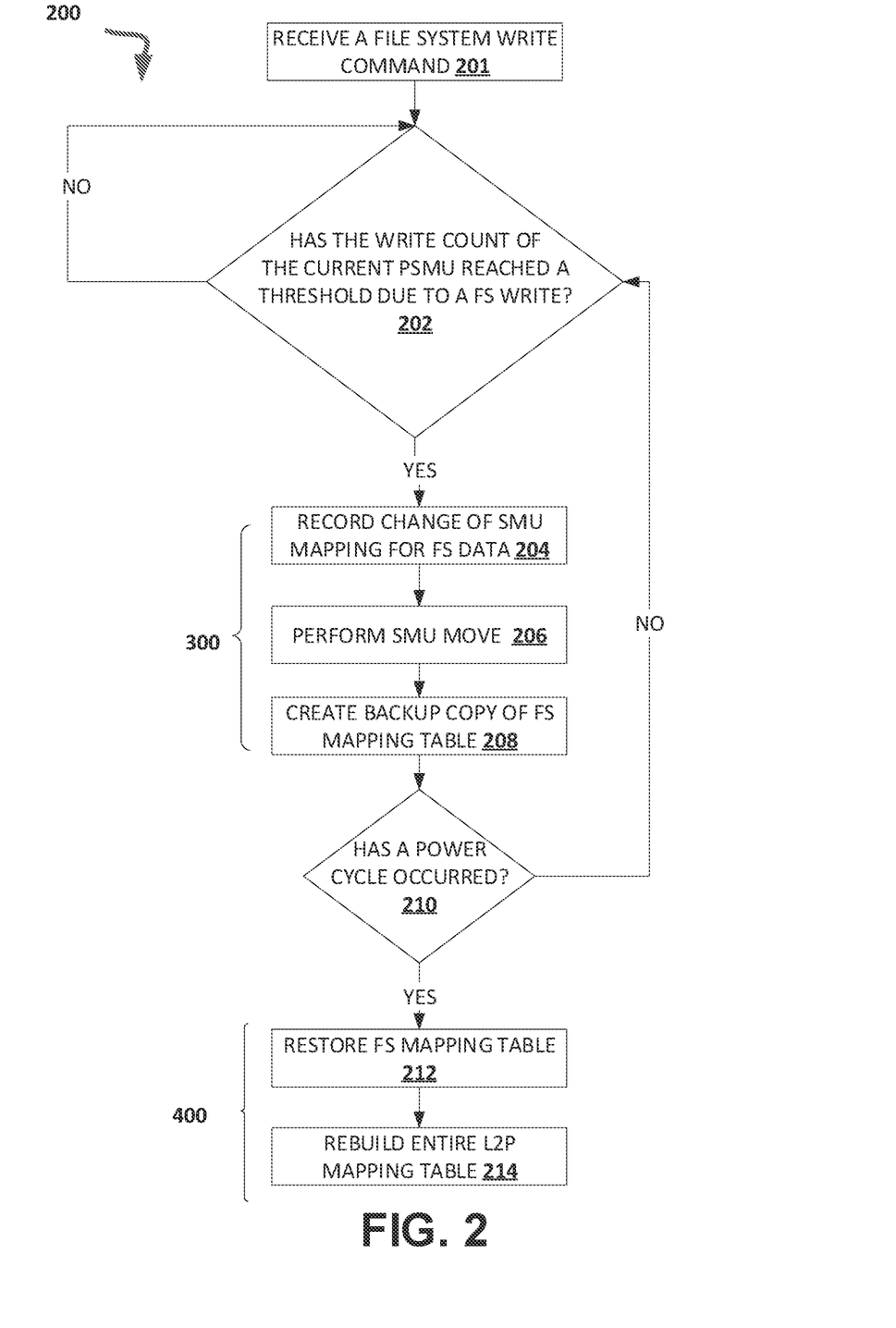
FIG. 2 is a flow diagram of an example method for reliable and rapid access to file system (FS) data in accordance with some embodiments of the present disclosure.

FIG. 2 is a flow diagram of an example method 200 to ensure a rapid and reliable access to FS data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the L2P and FS mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 201, the processing logic can receive a FS write command. The write command may be sent from host system 120, memory sub-system controller 115, or another device. Each write to a current PSMU will increase the PSMU's write count. For example, in one embodiment, L2P and FS mapping component 113 maintains a counter (e.g., in local memory 119) corresponding to each PSMU, which is incremented in response to each write operation performed on the corresponding PSMU. Accordingly, at operation 202, the processing logic can determine whether the write count of the current PSMU has satisfied a threshold criterion (e.g., reaching a threshold value due to a FS write operation). For example, L2P and FS mapping component 113 can compare the write count to the threshold value, and if the write count meets or exceeds the threshold value, can determine that the threshold criterion is satisfied. If the threshold criterion is satisfied, a change of SMU data mapping can be performed.

At operation 204, the processing logic can record a change of the SMU mapping for FS data of an FS mapping table. Recording a change can include writing a record of an association between a logical super management unit (LSMU), a current/old PSMU, and a new PSMU to which data is intended to be written, to a location on the medium of the non-volatile memory device 130. This location can be different than the location where the backup copy of the FS mapping table is saved and where the F2P mapping table is saved. In some embodiments, the recording of the change at operation 204 occurs if the write count threshold criterion has been met. The FS mapping table can be a portion of a larger L2P mapping table that contains both host data and file system data.

At operation 206, the processing logic can perform the SMU move operation. In some embodiments, the SMU move operation is not performed until the recording of the mapping change of operation 204 is complete. The purpose of the waiting can be to avoid the situations where (i) an SMU move operation is started and interrupted by an asynchronous power loss (APL) while the latest change to the SMU mapping was not recorded, and where (ii) two consecutive SMU move operations cause a collision. Accordingly, in one embodiment, the SMU move in operation 206 corresponds to the change recorded in operation 204.

At operation 208, the processing logic can create a backup copy of the FS mapping table on the non-volatile memory device 130. More details of operations 204-208 are presented in example method 300 for securely recording a change in an SMU mapping with reference to FIG. 3. It should be understood that a power cycle or power loss can occur at any point during or between operations 201-208. The operations described below address the situations occurring after or caused by such a power loss or cycle.

At operation 210, the processing logic determines whether a power loss or power cycle has occurred. In one embodiment, as part of a sequence of boot up operations, the processing logic determines upon boot up that it is in a state immediately subsequent to a power loss. If it has, a process to restore the FS mapping table can be initiated.

At operation 212, the processing logic can restore the FS mapping table to the volatile memory device 140 or the local memory 119 from the backup copy of the FS mapping table found in the non-volatile memory device 130. In one embodiment, restoring the mapping table can entail reading or uploading from a location on the non-volatile memory device 130 a copy of the FS mapping table into the local memory 119 or the volatile memory device 140 for rapid access by the FW. In some embodiments, at operation 214, the operating logic can rebuild the entire L2P mapping table in the volatile memory device 140 or the local memory 119. This can entail the reading or uploading from a location on the non-volatile memory device 130 the entire L2P mapping table that includes the FS data (i.e., the FS mapping table portion) as well as the host data into the local memory 119 or the volatile memory device 140. Additional details regarding these processes are described below with reference to method 400 depicted in FIG. 4.

Figure 3:
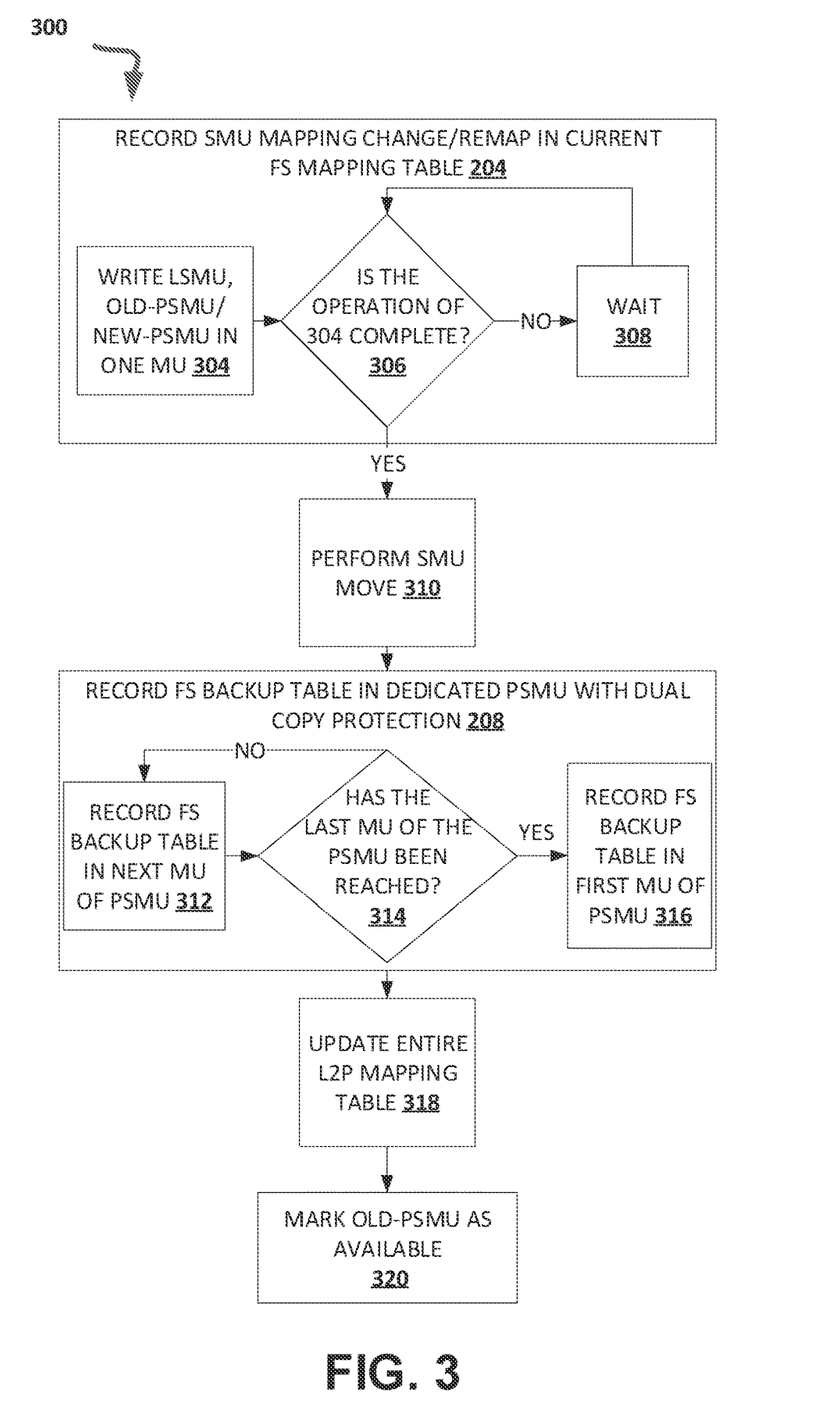
FIG. 3 is a flow diagram of an example method to securely record a change of a super management unit (SMU) mapping in accordance with some embodiments of the present disclosure.

FIG. 3 is a flow diagram of an example method 300 to ensure a secure recording of an SMU mapping change. The example method 300 can also be understood to be a method for securely saving an accurate and current FS mapping table. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the L2P and FS mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In one embodiment, operation 204, as described above with respect to FIG. 2, for recording the SMU mapping change (i.e., SMU remap) in the current mapping table can include operations 304-308. At operation 304, the processing logic can record a correspondence between a logical super management unit (LSMU), an old PSMU, and a new PSMU, for a set of FS data, in one MU of a dedicated PSMU of the medium of the non-volatile memory device 130. In one embodiment, the processing logic records in which PSMU the data corresponding to the LSMU was previously recorded and to which PSMU it is going to be moved.

At operation 306, the processing logic can determine whether the write operation 304 is complete. If it is not complete, at operation 308, the processing logic waits until the completion of the write operation 304 prior to performing operation 310. Accordingly, at operation 310, the processing logic can perform the SMU move operation to move the SMU data from one PSMU to another PSMU on the medium of the non-volatile memory device 130. As noted above, in some embodiments, the move operation 310 is not performed until the write operation 304 is complete to avoid discrepancies and errors in the recorded information that can be caused due to a power cycle or APL.

In one embodiment, operation 208, as described above with respect to FIG. 2, for creating a backup copy of the FS mapping table can include operations 312-316 in some embodiments. In one embodiment, operation 208 includes recording a backup FS mapping table in a dedicated PSMU with dual copy protection. Accordingly, at operation 312, the processing logic can record the backup copy of the FS mapping table in the next management unit MU of the dedicated PSMU. As noted earlier, the dedicated PSMU can function as a circular buffer by sequentially iterating the MUs of the PSMU into which the backup copies of the FS mapping table are saved. Thus, at operation 314, the processing logic can determine whether the last MU of the dedicated PSMU has been reached. If it has not, then the next backup copy of the FS mapping table can be recorded in the next MU of the PSMU. If it has been reached, at operation 316 the next backup copy of the FS mapping table can be recorded in the first MU of the PSMU and thereby restart the cycle from the beginning.

In some embodiments, at operation 318, the processing logic can update the entire L2P mapping table (including both the FS data mapping portion and the host data mapping portion). The update of the entire L2P mapping table can occur simultaneously with operation 208 or after its completion. In one embodiment, operation 318 of updating the L2P table includes updating the FS mapping portion of the L2P table with the latest remap (i.e., SMU mapping change) information. The L2P table can also be saved on the medium of the non-volatile memory device 130. In some embodiments the L2P table is saved in a different location on the medium than the backup copy of the FS mapping table and the record of the latest mapping change. In one embodiment, at operation 320, the old PSMU can then be marked as a spare (i.e., available for being written to.

Figure 4:
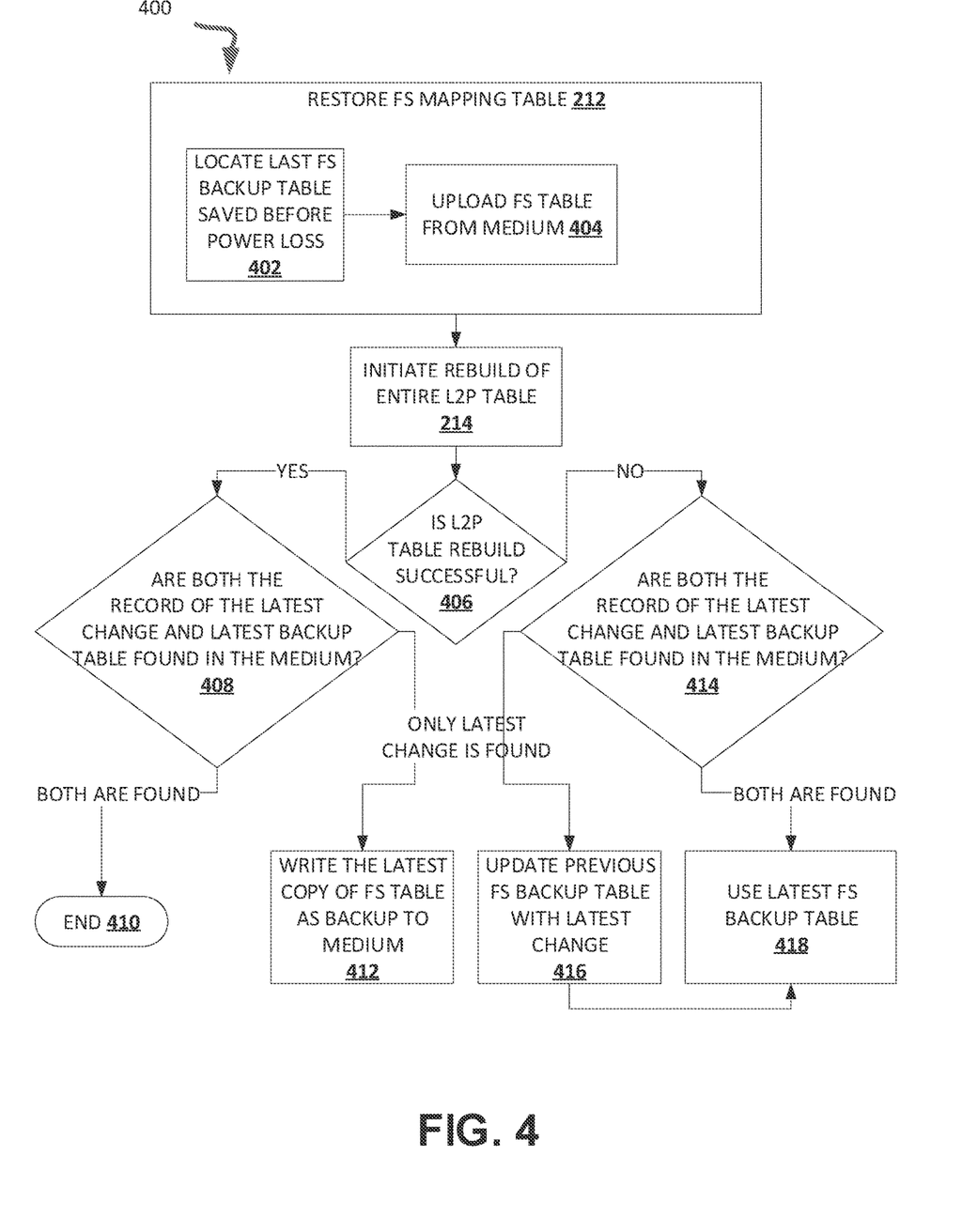
FIG. 4 is a flow diagram of an example method to restore and rebuild FS mapping in accordance with some embodiments of the present disclosure.

FIG. 4 is a flow diagram of an example method 400 to restore and rebuild FS mapping. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the L2P and FS mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In one embodiment, operation 212, as described above with respect to FIG. 2, for restoring the FS mapping table can include operations 402-404. At operation 402, the processing logic can locate the last/latest backup copy of the FS mapping table saved on the non-volatile memory device before the occurrence of the power cycle or power loss. In some embodiments, the latest saved FS mapping table may not correspond to or include the latest mapping change because the recording of the change or saving of the backup copy of the FS mapping table can be aborted if a command is in the MU wait queue. The latest backup copy of the mapping table can be located by performing a binary search to find the pointer to the last FS backup table saved. The latest backup FS mapping table saved should have the largest sequence number.

At operation 404, the processing logic can read/upload the backup copy of the FS mapping table from the medium of the non-volatile memory device 130 to the volatile memory 140 or the local memory 119. At this point the FS mapping table should be available to and accessible the FW and other components of the system regardless of the status or state of the L2P table.

As mentioned earlier, at operation 214, the processing logic can initiate the rebuilding of the entire L2P mapping table. However, the attempt to reconstruct the L2P mapping table may or may not be successful. Accordingly, at operation 406, the processing logic can determine whether or not the attempt to rebuild the L2P mapping table was successful. If it was, then, the FS table from the rebuilt L2P mapping table can be used. Accordingly, in operation 408, the processing logic can determine whether both of (i) the record of the latest change of the SMU mapping and (ii) the latest backup copy of the FS mapping table were found during operation 404 (i.e., in the medium of the non-volatile memory device 130). If both are found, then no operation to modify either one needs to be performed at block 410 since this indicates that the most current backup copy of the FS mapping table reflects the most current separately recorded mapping change. If only the latest change is found in the medium but not the latest FS mapping table, then, at operation 412, the processing logic can write the latest copy of the FS mapping table from the rebuilt L2P table as a backup to the non-volatile memory device 130.

If the attempt to rebuild/reconstruct the L2P mapping table was not successful, then, the FS table obtained during operation 404 can be used. Accordingly, in operation 414, the processing logic can determine whether both of (i) the record of the latest change of the SMU mapping and (ii) the latest backup copy of the FS mapping table are present in the medium of the non-volatile memory device 130. If both are present, then at operation 418, the processing logic can use the latest FS backup table in subsequent processes. If only the latest change is found in the medium but not the latest FS mapping table, then, at operation 416, the processing logic can update the previous backup copy of the FS mapping table with the latest change of the SMU mapping. In the latter case, after updating the previous backup copy of the FS table the processing logic can then use it as the latest FS backup table.

Figure 5:
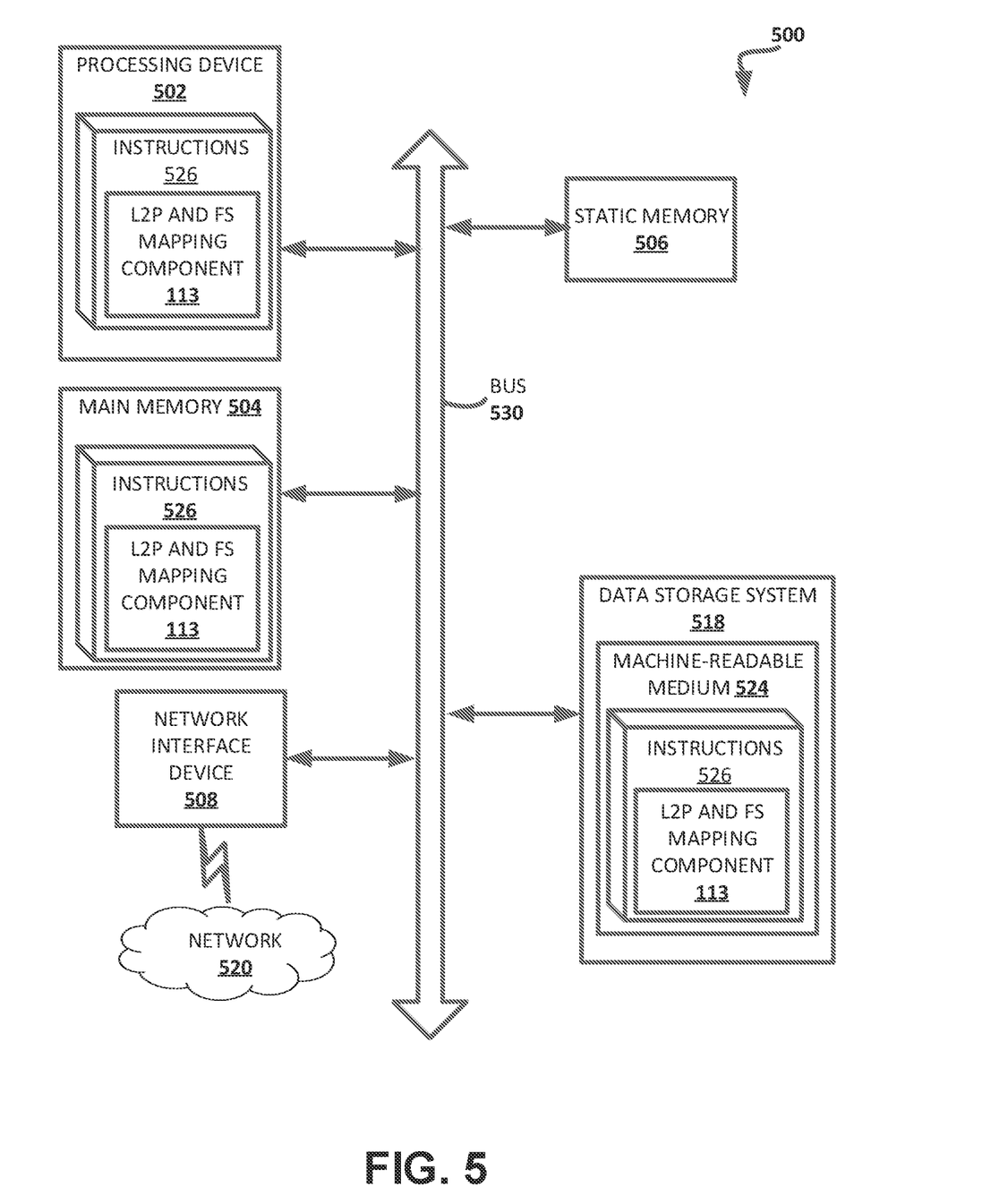
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the L2P and FS mapping component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a L2P and FS mapping component (e.g., the L2P and FS mapping component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices comprising a volatile memory device and a non-volatile memory device; and
a processing device, operatively coupled with the plurality of memory devices to perform operations comprising:
receiving a file system (FS) write command;
determining whether a write count of a physical super management unit (PSMU) of the non-volatile memory device satisfies a threshold criterion;
responsive to the write count satisfying the threshold criterion, recording a change of a super management unit (SMU) mapping for FS data of an FS mapping table, wherein the FS mapping table is a portion of a logical-to-physical (L2P) mapping table, the FS mapping table comprising a record of an FS data mapping, and the L2P mapping table comprising an FS data mapping portion and a host data mapping portion;
performing a move of SMU data corresponding to the change of the SMU mapping;
creating a backup copy of the FS mapping table, in a location on the non-volatile memory device that is different than the location where the L2P mapping table is saved, the backup copy comprising the record of the FS data mapping; and
responsive to a power cycle, restoring the FS mapping table to the volatile memory device from the backup copy of the FS mapping table.

2. The system of claim 1, wherein the processing device is to perform operations further comprising:
initiating a rebuilding of the L2P mapping table on the volatile memory device.

3. The system of claim 1, wherein recording the change of the SMU mapping comprises recording, in one management unit (MU), a correspondence between a logical super management unit (LSMU), an old physical super management unit (PSMU), and a new PSMU, for a set of FS data.

4. The system of claim 1, wherein creating the backup copy of the FS mapping table comprises recording the backup copy of the FS mapping table in a next management unit (MU) of a dedicated PSMU with dual copy protection, and, in response to reaching a last MU of the dedicated PSMU, recording the backup copy of the FS mapping table in a first management unit (MU) of a dedicated PSMU.

5. The system of claim 1, wherein the processing device is to perform operations further comprising:
updating the L2P mapping table with the recorded change of the SMU mapping.

6. The system of claim 1, wherein restoring the FS mapping table further comprises locating a last backup copy of the FS mapping table saved on the non-volatile memory device before the power cycle, and uploading the last backup copy of the FS mapping table to the volatile memory device.

7. The system of claim 2, wherein the processing device is to perform operations further comprising:
responsive to an unsuccessful rebuilding of the L2P mapping table, determining whether a latest change of the SMU mapping and a latest backup copy of the FS mapping table are found on the non-volatile memory device,
in response to determining that the latest change of the SMU mapping is found and determining that the latest backup copy of the FS mapping table is not found, updating a previous backup copy of the FS mapping table with the latest change of the SMU mapping on the non-volatile memory device; and
in response to determining that both the latest change of the SMU mapping and the latest backup copy of the FS mapping table are found, using the latest backup copy of the FS mapping table from the non-volatile memory device.

8. The system of claim 2, wherein the processing device is to perform operations further comprising:
responsive to a successful rebuilding of the L2P mapping table, determining whether a latest change of the SMU mapping and a latest backup copy of the FS mapping table are found on the non-volatile memory device, and
in response to determining that the latest change of the SMU mapping is found and determining that the latest backup copy of the FS mapping table is not found, writing a latest copy of the FS mapping table from the L2P mapping table as a backup to the non-volatile memory device.

9. A method comprising:
receiving a file system (FS) write command;
determining whether a write count of a physical super management unit (PSMU) of a non-volatile memory device satisfies a threshold criterion;
responsive to the write count satisfying the threshold criterion, recording a change of a super management unit (SMU) mapping for FS data of an FS mapping table, wherein the FS mapping table is a portion of a logical-to-physical (L2P) mapping table, the FS mapping table comprising a record of an FS data mapping, and the L2P mapping table comprising an FS data mapping portion and a host data mapping portion;
performing a move of SMU data corresponding to the change of the SMU mapping;
creating a backup copy of the FS mapping table, in a location on the non-volatile memory device that is different than the location where the L2P mapping table is saved, the backup copy comprising the record of the FS data mapping; and
responsive to a power cycle, restoring, by a processing device, the FS mapping table to a volatile memory device from the backup copy of the FS mapping table.

10. The method of claim 9, further comprising initiating a rebuilding of the L2P mapping table on the volatile memory device.

11. The method of claim 9, wherein recording the change of the SMU mapping comprises recording, in one management unit (MU), a correspondence between a logical super management unit (LSMU), an old physical super management unit (PSMU), and a new PSMU, for a set of FS data.

12. The method of claim 9, wherein creating the backup copy of the FS mapping table comprises recording the backup copy of the FS mapping table in a next management unit (MU) of a dedicated PSMU with dual copy protection, and, in response to reaching a last MU of the dedicated PSMU, recording the backup copy of the FS mapping table in a first management unit (MU) of a dedicated PSMU.

13. The method of claim 9, wherein restoring the FS mapping table further comprises locating a last backup copy of the FS mapping table saved on the non-volatile memory device before the power cycle, and uploading the last backup copy of the FS mapping table to the volatile memory device.

14. The method of claim 10, further comprising:
responsive to an unsuccessful rebuilding of the L2P mapping table, determining whether a latest change of the SMU mapping and a latest backup copy of the FS mapping table are found on the non-volatile memory device,
in response to determining that the latest change of the SMU mapping is found and determining that the latest backup copy of the FS mapping table is not found, updating a previous backup copy of the FS mapping table with the latest change of the SMU mapping on the non-volatile memory device; and
in response to determining that both the latest change of the SMU mapping and the latest backup copy of the FS mapping table are found, using the latest backup copy of the FS mapping table from the non-volatile memory device.

15. The method of claim 10, further comprising:
responsive to a successful rebuilding of the L2P mapping table, determining whether a latest change of the SMU mapping and a latest backup copy of the FS mapping table are found on the non-volatile memory device, and
in response to determining that the latest change of the SMU mapping is found and determining that the latest backup copy of the FS mapping table is not found, writing a latest copy of the FS mapping table from the L2P mapping table as a backup to the non-volatile memory device.

16. A non-transitory computer-readable storage medium comprising instructions that, when executed by a processing device, cause the processing device to perform operations comprising:
recording a change of a super management unit (SMU) mapping for FS data of an FS mapping table, wherein the FS mapping table is a portion of a logical-to-physical (L2P) mapping table, the FS mapping table comprising a record of an FS data mapping, and the L2P mapping table comprising an FS data mapping portion and a host data mapping portion;
performing a move of SMU data corresponding to the change of the SMU mapping;
creating a backup copy of the FS mapping table, in a location on a non-volatile memory device that is different than the location where the L2P mapping table is saved, the backup copy comprising the record of the FS data mapping;
updating the L2P mapping table with the recorded change of the SMU mapping;
responsive to a power cycle, restoring the FS mapping table to a volatile memory device from the backup copy of the FS mapping table; and
initiating a rebuilding of the L2P mapping table on the volatile memory device.

17. The non-transitory computer-readable storage medium of claim 16, wherein the instructions, when executed, will cause the processing device to perform operations further comprising:
receiving a file system (FS) write command; and determining whether a write count of a physical super management unit (PSMU) of the non-volatile memory device satisfies a threshold criterion, wherein recording the change of the SMU mapping is responsive to the write count satisfying the threshold criterion and wherein recording the change of the SMU mapping comprises recording, in one management unit (MU), a correspondence between a logical super management unit (LSMU), an old physical super management unit (PSMU), and a new PSMU, for a set of FS data.

18. The non-transitory computer-readable storage medium of claim 16, wherein creating the backup copy of the FS mapping table comprises recording the backup copy of the FS mapping table in a next management unit (MU) of a dedicated PSMU with dual copy protection, and, in response to reaching a last MU of the dedicated PSMU, recording the backup copy of the FS mapping table in a first management unit (MU) of a dedicated PSMU.

19. The non-transitory computer-readable storage medium of claim 16, wherein the instructions, when executed, will cause the processing device to perform operations further comprising:
  responsive to an unsuccessful rebuilding of the L2P mapping table, determining whether a latest change of the SMU mapping and a latest backup copy of the FS mapping table are found on the non-volatile memory device,
  in response to determining that the latest change of the SMU mapping is found and determining that the latest backup copy of the FS mapping table is not found, updating a previous backup copy of the FS mapping table with the latest change of the SMU mapping on the non-volatile memory device; and
  in response to determining that both the latest change of the SMU mapping and the latest backup copy of the FS mapping table are found, using the latest backup copy of the FS mapping table from the non-volatile memory device.

20. The non-transitory computer-readable storage medium of claim 16, wherein the instructions, when executed, will cause the processing device to perform operations further comprising:
  responsive to a successful rebuilding of the L2P mapping table, determining whether a latest change of the SMU mapping and a latest backup copy of the FS mapping table are found on the non-volatile memory device, and
  in response to determining that the latest change of the SMU mapping is found and determining that the latest backup copy of the FS mapping table is not found, writing a latest copy of the FS mapping table from the L2P mapping table as a backup to the non-volatile memory device.

* * * * *